Figure 1:
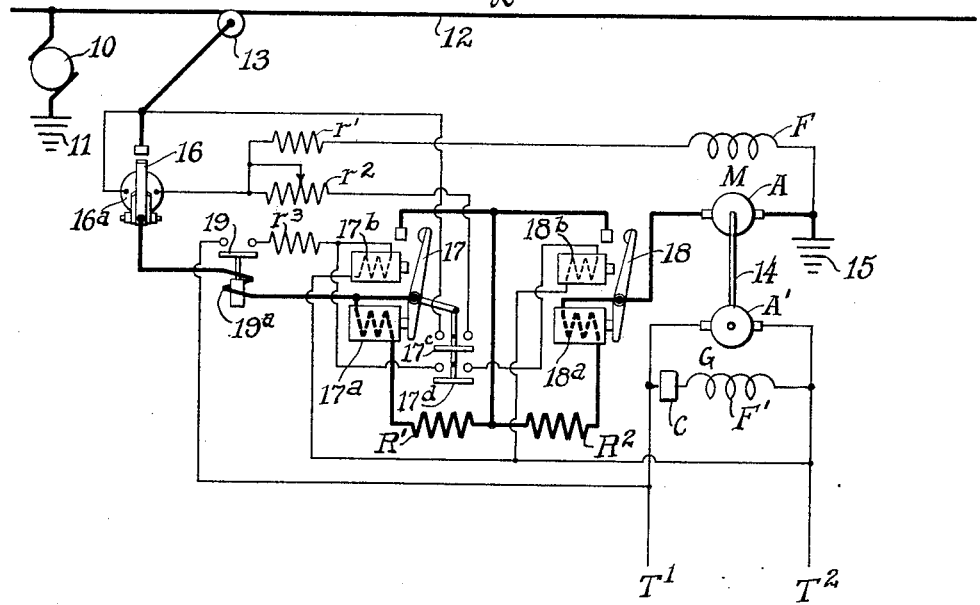

May 31, 1932.  E. W. SEEGER  1,860,626

SYSTEM OF ELECTRICAL DISTRIBUTION

Filed Aug. 28, 1930

Inventor
Edwin W. Seeger
By Frank H. Hubbard
Attorney

Patented May 31, 1932

1,860,626

UNITED STATES PATENT OFFICE

EDWIN W. SEEGER, OF WAUWATOSA, WISCONSIN, ASSIGNOR TO CUTLER-HAMMER, INC., OF MILWAUKEE, WISCONSIN, A CORPORATION OF DELAWARE

SYSTEM OF ELECTRICAL DISTRIBUTION

Application filed August 28, 1930. Serial No. 478,321.

This invention relates to systems of electrical distribution.

The invention is particularly applicable to systems wherein a motor-generator set converts current from a source of relatively high voltage such as a trolley system into current of reduced voltage for supplying low voltage translating devices such as the lamps of a trolley car.

In such systems the generator is usually disconnected from the load circuit during starting and automatic means is provided for connecting the generator to the load circuit and for weakening the field thereof when the motor-generator set is brought up to speed. In practice it has been found that if the motor generator set is accelerated too rapidly the control means associated with the generator will operate while the generator voltage is still at a relatively low value and as a result the generator will not build up to normal voltage when connected to the load circuit.

The present invention has among its objects to provide a system of the aforesaid character wherein provision is made for controlling the rate of acceleration of the motor-generator set to insure building up of the generator voltage to normal value.

Another object is to provide a system of the aforesaid character having improved control means which provides for automatic starting of the motor generator set when the voltage of the supply source exceeds a given value and which also provides for stopping of the motor-generator set under low voltage conditions in the supply source or upon failure of the shunt field winding of the motor.

Another object is to provide a system of the aforesaid character which insures inclusion of starting resistance in the motor circuit upon failure of power in the supply circuit.

Various other objects and advantages of the invention will hereinafter appear.

The accompanying drawings illustrate two embodiments of the invention which will now be described, it being understood that the embodiments illustrated are susceptible of modification without departing from the spirit and scope of the appended claims.

Figure 2:
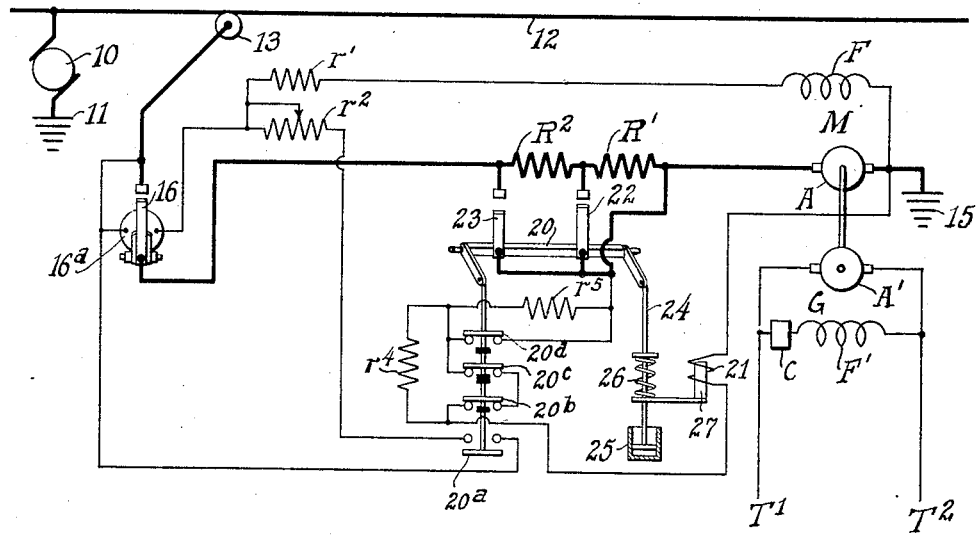

In the drawings,

Figure 1 diagrammatically illustrates one form of system constructed and arranged in accordance with the invention, and Fig. 2 diagrammatically illustrates a modification of the system illustrated in Fig. 1.

Referring to the drawings, and more particularly to Fig. 1, there is indicated at 10 a source of current of relatively high voltage, one terminal of which is grounded at 11, and the other terminal of which is connected to a transmission line indicated at 12. Where the system is associated with an electric vehicle a suitable form of current collecting device is employed such as a trolley 13 so that the vehicle may be supplied with energy from the transmission line 12 while the same is in transit or at rest.

A motor generator set is shown of which the motor is represented at M and the generator at G, the two being mechanically coupled by a shaft 14. Motor M has one terminal grounded at 15 and the same is provided with an armature A and a shunt field winding F. The generator is provided with an armature $A^1$ and a shunt field winding $F^1$, and as is the usual practice a field regulator C of any suitable type is employed to effect weakening of the generator field when the generator is brought up to speed.

The control means for motor M includes an electro-responsive main switch 16 and a pair of accelerating switches 17 and 18 for controlling resistances $R^1$ and $R^2$ in the armature circuit of said motor. Main switch 16 provides for connection of the motor armature A to trolley 13 through the medium of resistances $R^1$ and $R^2$ and the operating winding $16^a$ of said main switch has one terminal permanently connected to trolley 13 and its opposite terminal permanently connected to the motor field winding F through the medium of a resistance $r^1$. Each of the accelerating switches is provided with a lockout winding $a$ for holding the same in open position and an operating winding $b$ for moving the same to closed position. The lockout windings $a$ are connected in series in the armature circuit of the motor and the operating windings $b$ are adapted to be supplied with current from the generator through the medium of a relay 19 having a series operating winding $19^a$. The control means also includes two sets of normally open auxiliary contacts $17^c$ and $17^d$ associated with switch 17, the former contacts being adapted to connect an adjustable resistance $R^2$ in shunt with the operating winding of main switch 16 and the latter being arranged in the energizing circuit of the operating winding $18^b$ of switch 18.

The function and operation of the above described system and also the circuit connections thereof will now be more fully described. As hereinbefore set forth one terminal of the operating winding $16^a$ of main switch 16 is permanently connected to trolley 13 while the opposite terminal thereof is connected through a resistance $r^1$ to the field F of the motor. The operating winding $16^a$ and field F are thus supplied with current from source 10 and said winding is adapted to effect response to main switch 16 when the voltage of said source exceeds a given value, as for example 400 volts. Upon closure of main switch 16 the armature circuit of the motor is completed through resistances $R^1$ and $R^2$ and the motor then starts. The inrush current causes relay 19 to respond and upon response of said relay the operating winding $17^b$ of accelerating switch 17 is energized by a circuit extending from terminal $T^1$ of the generator through relay 19 through a resistance $R^3$ and through the operating winding $17^b$ to terminal $T^2$. Accelerating switch 17 does not respond immediately due to the action of its lockout winding $17^a$. However, as the motor speed increases the current supplied by generator G to the operating winding $17^b$ increases while the current in the lockout winding $17^a$ decreases, and upon a given degree of acceleration of motor M the former winding overcomes the restraining action of the latter winding and switch 17 then closes to exclude resistance $R^1$ from the armature circuit of the motor.

Also upon closure of switch 17 the auxiliary contacts $17^d$ thereof establish an energizing circuit for the operating winding $18^b$ extending from terminal $T^1$ of the generator through relay 19 through resistance $R^3$ through auxiliary contacts $17^d$ and through the operating winding $18^b$ to terminal $T^2$ of the generator. Thus upon exclusion of resistance $R^1$ from the armature circuit of the motor the operating winding $18^b$ of accelerating switch 18 tends to effect response of said switch. However, accelerating switch 18 does not respond immediately due to the action of its lockout winding $18^a$ but upon further acceleration of the motor the current supplied by generator G to the operating winding $18^b$ increases while the current in the lockout winding $18^a$ decreases until the former winding overcomes the restraining action of the latter winding whereupon switch 18 closes to exclude resistance $R^2$ from the armature circuit of the motor. The motor is then brought up to full speed and maintained in operation pending opening of main switch 16.

Upon closure of accelerating switch 17 the auxiliary contacts $17^c$ thereof close to connect the adjustable resistance $R^2$ in shunt with the operating winding $16^a$ of the main switch. Resistance $R^2$ reduces the current in the operating winding $16^a$ and said resistance is adjusted to permit opening of said main switch when the voltage of source 10 drops to a given value, as for example 350 volts.

From the foregoing it is apparent that main switch 16 provides for automatic starting of the motor-generator set when the voltage of the supply source exceeds a given value and also provides for automatic stopping of the motor generator set upon predetermined low voltage conditions. Furthermore since the operating winding of main switch 16 is connected in series with the shunt field winding F said switch is adapted to open upon failure of said field winding and thus provides field failure protection. It should also be noted that accelerating switches 17 and 18 can be designed to provide for acceleration of the motor at the required rate and since the series relay is adapted to drop out upon opening of main switch 16 said accelerating switches will open to insure inclusion of resistance $R^1$ and $R^2$ in the motor circuit during restarting. Thus it is apparent that while the above described system is capable of general use the same is particularly adapted for use in electric railway systems wherein the voltage of the transmission line varies over a considerable range and wherein the supply of current is frequently interrupted due to dead sections in the transmission line.

The system illustrated in Fig. 2 is similar to that shown in Fig. 1, except that the resistances $R^1$ and $R^2$ are controlled by a resistance varying device 20 having an operating winding 21 connected across the motor armature A. Device 20 is provided with contact fingers 22 and 23 which are adapted to close in the order named, to exclude resistances $R^1$ and $R^2$ upon upward movement of an operating member 24. Upward movement of member 24 is retarded by a dash pot 25 and such movement is effected by a spring 26 which is adapted to be compressed upon attraction of a plunger 27 associated with the operating winding 21. Device 20 is also provided with normally open auxiliary contacts $20^a$ for connecting the resistance $R^2$ in shunt with the operating winding $16^a$ of main switch 16 and normally closed auxiliary contacts $20^b$, $20^c$ and $20^d$ for connecting maintaining resistances $r^4$ and $r^5$ in the energizing circuit of the operating winding 21.

In the system shown in Fig. 2 the main switch 16 operates in substantially the same manner as in Fig. 1, the same being adapted to close when the voltage of the source 10 exceeds a given value. Upon closure of main switch 16 the armature circuit of the motor is completed through resistances $R^1$ and $R^2$ and the motor then starts. Winding 21 is normally connected across the terminals of the motor armature A through the medium of contacts $20^b$, $20^c$ and $20^d$ and the same is thus supplied with current which increases as the speed of the motor increases. Upon a given degree of acceleration of the motor, winding 21 acts through the medium of plunger 27 and spring 26 to move member 24 upwardly against the action of dash pot 25. During upward movement of member 24 contact finger 22 moves to closed position to exclude resistance $R^1$ from the armature circuit of the motor and thereafter contact finger 23 moves to closed position to exclude resistance $R^2$ from said circuit. Upon initial upward movement of member 24 auxiliary contacts $20^a$ close to connect resistance $r^2$ in shunt with the operating winding $16^a$ and as set forth in connection with Fig. 1 the main switch 16 is then adapted to open upon a given reduction in the voltage of source 10 or upon failure of the shunt field winding of the motor. Also during upward movement of the operating member 24 auxiliary contacts $20^b$ and $20^c$ open to insert the maintaining resistance $r^4$ in series with the operating winding 21 and thereafter auxiliary contacts $20^d$ open to insert maintaining resistance $r^5$ in series with said winding.

What I claim as new and desire to secure by Letters Patent is:

1. The combination with an electric motor having a shunt field winding, of a supply circuit for said motor, a line switch for connecting the armature of said motor to said supply circuit when the voltage of said circuit exceeds a given value, said switch having an operating winding connected to said supply circuit in series relation with the shunt field winding of said motor, and means rendering said line switch operable to disconnect said motor from said supply circuit upon a relatively small predetermined reduction in the voltage of said supply circuit, said means including a resistance and means for connecting said resistance in shunt with the operating winding of said line switch but only after closure of said line switch.

2. The combination with an electric motor having a shunt field winding, of a supply circuit for said motor, a line switch for connecting the armature of said motor to said supply circuit when the voltage of said circuit exceeds a given value, said switch having an operating winding connected to said supply circuit in series relation with the shunt field winding of said motor, an accelerating device for said motor operable upon closure of said line switch, and means associated with said device for reducing the current in the operating winding of said line switch to provide for dropping out of said line switch upon a relatively small predetermined reduction in the voltage of said supply circuit.

In witness whereof, I have hereunto subscribed my name.

EDWIN W. SEEGER.